US009489659B1

(12) United States Patent
Liu et al.

(10) Patent No.: US 9,489,659 B1
(45) Date of Patent: Nov. 8, 2016

(54) PROGRESSIVE SHARING DURING A COLLABORATION SESSION

(75) Inventors: Guangbing Liu, Sunnyvale, CA (US); Hailei Sheng, San Jose, CA (US); Qing Wang, San Jose, CA (US); Jianzhong Ding, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 372 days.

(21) Appl. No.: 13/437,068

(22) Filed: Apr. 2, 2012

(51) Int. Cl.
*G06Q 10/10* (2012.01)
*H04L 12/58* (2006.01)

(52) U.S. Cl.
CPC ........... *G06Q 10/10* (2013.01); *H04L 12/581* (2013.01)

(58) Field of Classification Search
CPC .. H04N 19/142; H04N 19/137; H04N 5/147; H04N 19/87; H04N 21/44012
USPC ......................................................... 709/204
See application file for complete search history.

(56) References Cited

U.S. PATENT DOCUMENTS

| | | | | |
|---|---|---|---|---|
| 6,118,817 | A * | 9/2000 | Wang .................. | H04N 19/147 375/240.03 |
| 6,816,616 | B2 | 11/2004 | Teng | |
| 7,031,342 | B2 | 4/2006 | Teng | |
| 7,933,955 | B2 * | 4/2011 | Khalatian .............. | G06F 3/038 709/203 |
| 7,945,621 | B2 | 5/2011 | Yuan et al. | |
| 8,195,009 | B2 * | 6/2012 | Hanamoto et al. ........... | 382/298 |
| 2002/0176025 | A1 * | 11/2002 | Kim ....................... | H03M 7/30 348/699 |
| 2005/0089232 | A1 * | 4/2005 | Hsu et al. ...................... | 382/236 |
| 2007/0036442 | A1 * | 2/2007 | Stoffer et al. ................. | 382/232 |
| 2010/0104021 | A1 * | 4/2010 | Schmit ..................... | 375/240.24 |
| 2010/0306413 | A1 * | 12/2010 | Kamay ................ | H04N 19/503 709/247 |
| 2011/0141133 | A1 * | 6/2011 | Sankuratri ............ | G06F 3/1454 345/600 |
| 2012/0219052 | A1 * | 8/2012 | Wakuda ............... | H04N 19/172 375/240.01 |
| 2012/0287987 | A1 * | 11/2012 | Budagavi ............. | H04N 19/105 375/240.02 |
| 2013/0060886 | A1 * | 3/2013 | Wynn et al. .................. | 709/217 |

* cited by examiner

*Primary Examiner* — Vivek Srivastava
*Assistant Examiner* — Muhammad Raza
(74) *Attorney, Agent, or Firm* — Edell, Shapiro & Finnan, LLC

(57) ABSTRACT

In accordance with one example, a presenter device is configured to participate in a collaboration session with one or more attendee devices. A change in an image displayed at a screen of the presenter device is detected and captured to produce a captured image. The captured image is compressed to form a compressed lossless file and first and second compressed lossy files. The compressed lossless file and the first compressed lossy file are transmitted to the one or more attendee devices, and a determination is made as to whether a further change to the image displayed at the screen occurs within a predetermined period of time. The compressed lossy file is transmitted to the one or more attendee devices when no further change to the image displayed at the screen occurs within the predetermined period of time.

13 Claims, 5 Drawing Sheets

PROGRESSIVE SHARING DURING A COLLABORATION SESSION

TECHNICAL FIELD

The present disclosure relates generally to sharing content during a collaboration session.

BACKGROUND

There has been an increase in the use of collaboration sessions that enable real-time sharing of content such as audio, graphical, and/or textual data between multiple participants (e.g., employees, vendors, clients, etc.) located at physically separate locations. These collaboration sessions are generally conducted over a wired or wireless computer network (e.g., local area network (LAN), wide area network (WAN), etc.).

The content shared during a collaboration session is typically sent over the network as discrete packets. These packets will generally include a header (routing information) and a payload (the shared content). To improve transmission efficiency, the shared content may be compressed before it is packetized so that more data may be transmitted within a given network bandwidth. Generally, the shared content is compressed at a source node, transmitted in the compressed state in the packets over the network, and decompressed at a destination node.

DESCRIPTION OF EXAMPLE EMBODIMENTS

Overview

Devices, methods and instructions encoded on computer readable media are provided herein for execution of progressive sharing techniques during a collaboration session. In one example, a presenter device is configured to participate in a collaboration session with one or more attendee devices. A change in an image displayed at a screen of the presenter device is detected and captured at the presenter device to produce a captured image. The captured image is compressed to form a compressed lossless file and first and second compressed lossy files. The compressed lossless file and the first compressed lossy file are transmitted to the one or more attendee devices, and a determination is made as to whether a further change to the image displayed at the screen occurs within a predetermined period of time. The compressed lossy file is transmitted to the one or more attendee devices when no further change to the image displayed at the screen occurs within the predetermined period of time.

Example Embodiments

Figure 1:
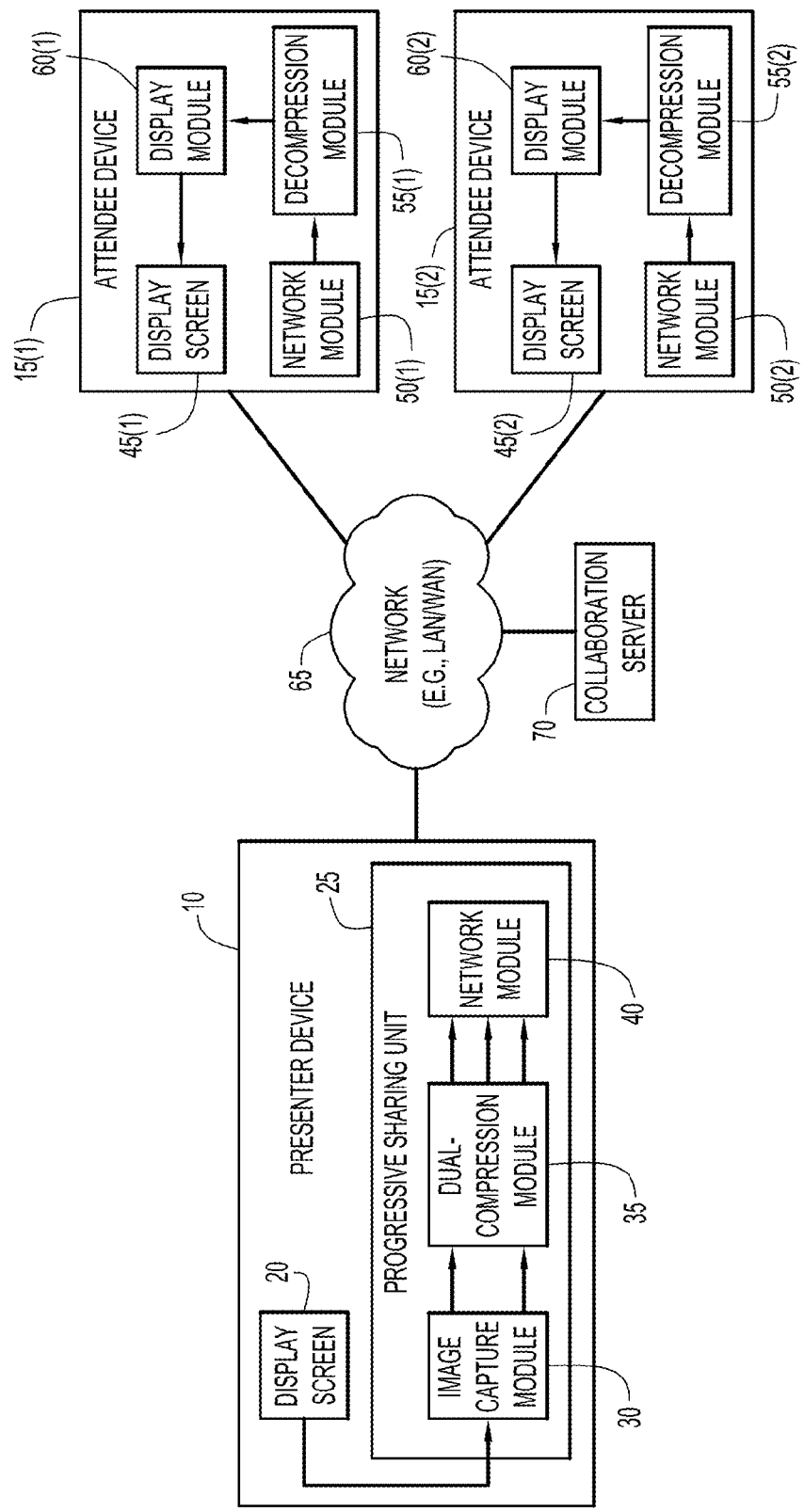
FIG. 1 is block diagram of a presenter device configured to progressively share images of its display screen with a plurality of attendee devices during a collaboration session.

FIG. 1 is a block diagram of a presenter device 10 configured to participate in a collaboration session, sometimes referred to as a desktop sharing session, with two attendee devices 15(1) and 15(2). Presenter device 10 comprises a display screen 20 and a progressive sharing unit 25. Progressive sharing unit 25 comprises an image capture module 30, a dual-compression module 35, and a network module 40. Attendee devices 15(1) and 15(2) each comprise a display screen 45(1) and 45(2), respectively, a network module 50(1) and 50(2), respectively, a decompression module 55(1) and 55(2), respectively, and a display module 60(1), and 60(2), respectively.

The collaboration session between presenter device 10 and attendee devices 15(1) and 15(2) occurs via a network 65, and is facilitated by a collaboration server 70. Network 65 may be, for example, a local area network (LAN) or a wide area network (WAN).

As used herein, a presenter device is a device configured to participate in a collaboration session in order to share content (i.e., audio, graphical, textual data, etc.) with other participants in the collaboration session. Attendee devices are devices configured to participate in the collaboration session in order to receive the content shared by the presenter device. Presenter device 10 and attendee devices 15(1) and 15(2) may be the same or different types of computing devices such as desktop computers, laptop computers, tablet computers, mobile phones, personal digital assistants (PDAs), etc.

The collaboration server 70 is configured to perform the set-up of a collaboration session, including access control, and to forward data traffic between the participating devices during the session. That is, collaboration server 70 is configured to "host" the collaboration session by maintaining a website, application, etc., through which content may be shared. In general, the presenter device 10 executes collaboration software that allows the presenter device to connect to collaboration server 70 and to establish the online collaboration session. Similarly, attendee devices 15(1) and 15(2) each execute the same or different collaboration software to connect to collaboration server 70 and join the online collaboration session.

In operation, presenter device 10 executes the collaboration software so that the content displayed on display screen 10 is transmitted to collaboration server 70. Collaboration server 70 is then configured to forward the content to each of the attendee devices 15(1) and 15(2). Attendee devices 15(1) and 15(2) also execute collaboration software so that the content received from presenter device 10 (via collaboration server 70) may be displayed on their display screens 45(1) and 45(2), respectively. It would be appreciated that collaboration server 70 is configured to pass the presentation responsibilities between the different participating devices. That is, a selected attendee device 15(1) or 15(2) may become the presenter device (i.e., the selected device begins to share its desktop), while, simultaneously, the presenter device 10 may become an attendee device. The general functionality of collaboration or desktop sharing software is well known in the art and will not be described in detail herein.

The content shared during a collaboration session is provided to the attendee devices 15(1) and 15(2) as quickly as possible so that the display screens 45(1) and 45(2) are updated soon after the display screen 20 is updated. That is, the collaboration software attempts to ensure that display screens 45(1) and 45(1) are updated substantially in "real-time" with the display screen 20. This real-time updating ensures that users at all participating devices are viewing the same content (after only minimal lag time), so as to improve the user experience.

During a collaboration session, the shared content is packetized and sent over the network 65 as discrete packets that comprise a packet header and/or trailer that includes control information (e.g., source and destination Media Access Control (MAC) addresses), error detection codes, sequencing information, etc.). The packets also comprise a payload that includes the shared content. Generally, limited network bandwidth is available for a collaboration session. As such, the shared content is typically compressed before it is packetized so that more data may be transmitted within the available bandwidth.

Due to the need for real-time updating, coupled with bandwidth limitations, conventional collaboration systems use compression and transmission techniques that limit the amount of data that is compressed and transmitted during given periods of time. This reduction in the amount of data that is compressed/transmitted reduces the quality of the images displayed at the attendee devices. That is, although the attendee devices 15(1) and 15(2) can quickly display an image that resembles the image on display screen 20, the image displayed at the attendee devices is of significantly less quality (e.g., less clear) that the original image. For example, as the result of conventional compression/transmission schemes employed in collaboration sessions, the image quality at the attendee devices 15(1) and 15(2) may be less than thirty-five (35) percent the quality of the original image displayed at display screen 20.

Examples described herein are generally directed to techniques for progressively sharing content displayed at display screen 20 in manner that ensures real-time updates of attendee devices, remains constrained to typical collaboration session bandwidth requirements (i.e., does not consume more bandwidth than conventional techniques), yet significantly improves the quality of the image displayed at the attendee devices 15(1) and 15(2). In the example of FIG. 1, the progressive sharing techniques are enabled by a collection of software and/or hardware components collectively referred to herein as progressive sharing unit 25.

Progressive sharing unit 25 first comprises an image capture module 30 that, as described further below, is configured to detect changes in the image displayed at display screen 20. When a change in the image is detected, image capture module 30 captures the changed portion of the image and separates the captured image into two images, namely a lossless image and a lossy image. As used herein, the lossless image generally comprises portions of the original image that need to be exactly recovered upon decompression. Such portions may include, for example, text data. Furthermore, as used herein, the lossy image generally comprises the portions of the original image other than the text (e.g., graphics, background, color data, etc.) that may not need to be exactly recovered upon decompression.

The lossless and lossy images generated by image capture module are provided to dual-compression module 35. Dual-compression module 35 is configured to execute two different compression techniques in order to process each of the received lossless and lossy images. More specifically, dual-compression module 35 executes a lossless compression technique to convert the lossless image into a compressed lossless file. A lossless compression technique is a compression technique that results in the recovery of substantially all of the data upon decompression. Similarly, dual-compression module 35 executes a lossy compression technique to generate first and second compressed lossy files. A lossy compression technique is a technique that reduces data by permanently eliminating certain information, especially redundant information, such that only a part of the original information is present and recoverable upon decompression. Further details of the dual-compression module 35 and the compression process are provided below.

The compressed lossless file and the first and second compressed lossy files are then provided to network module 40. Network module 40 is configured to generate packets that include the compressed files and to transmit the packets to collaboration server 70 for forwarding to attendee devices 15(1) and 15(2). However, as detailed below, network module 40 is configured to generate/transmit packets in a specific manner that ensures real-time updates of the attendee devices 15(1) and 15(2), significantly improves the quality of the image displayed at the attendee devices 15(1) and 15(2), while ensuring transmissions remain constrained to typical collaboration session bandwidth requirements.

The packets transmitted by network module 40 are received by collaboration server 70. Collaboration server 70 is configured to re-direct and/or duplicate the received packets so that the packets are received by each of network modules 50(1) and 50(2) in attendee devices 15(1) and 15(2), respectively. Network modules 50(1) and 50(2) are configured to parse the received packets in order to extract the various compressed files. Decompression modules 55(1) and 55(2) decompress the received files and provide the recovered data to display modules 60(1) and 60(2), respectively. Display modules 60(1) and 60(2) each comprise hardware and/or software components configured to perform video decoding, video rendering, and other operations to display the recovered data as video signals at display screens 45(1) and 45(2), respectively.

Figure 2:
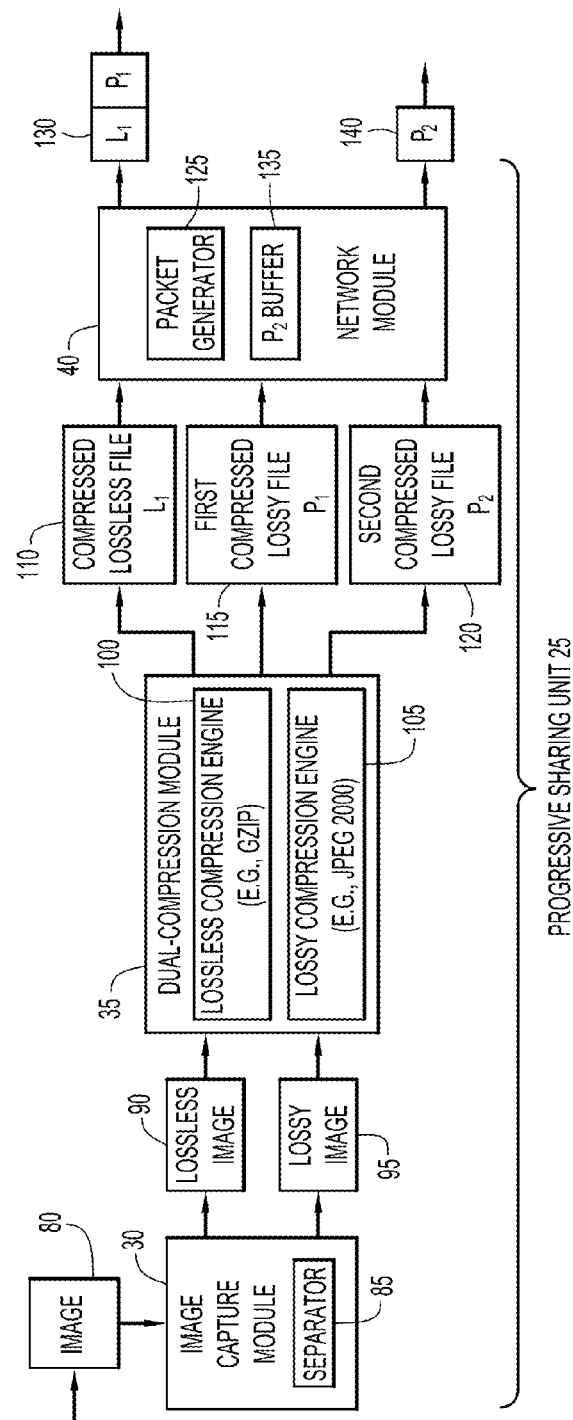
FIG. 2 is a block diagram of the presenter device configured to execute progressive sharing techniques.

FIG. 2 is a block diagram illustrating further details of the execution of progressive sharing techniques by presenter device 10. As noted above, image capture module 30 is configured to monitor display screen 20 to determine if the image displayed on the screen changes or is otherwise updated. During a typical collaboration session, it is possible that, at a given time, only a portion of the image may change. In such circumstances, it is generally undesirable to compress and transmit the portions of the displayed image that remain unchanged because such operations needlessly consume processing power and bandwidth.

To the enable image capture module 30 to determine which portions of the image have changed, the display screen 20 is functionally separated into a plurality of logical blocks 75(1)-75(N). Each block 75(1)-75(N) comprises, for example, a group of pixels of display screen 20 that are physically positioned in proximity to one another. Each of these blocks 75(1)-75(N) are monitored such that only the specific changed portions of the displayed image are captured and ultimately transmitted to attendee devices 15(1) and 15(2). For purposes of illustration, the example of FIG. 2 will be described with reference to a change detected at block 75(1). It is to be appreciated that this is merely an example and that changes in multiple blocks may be simultaneously detected, compressed, and transmitted in accordance with the progressive sharing techniques described herein.

In operation, the image 80 displayed at block 75(1) is captured by image capture module 30. Image capture module 30 includes, in this example, a separator 85 that separates image 80 into a lossless image 90 and a lossy image 95. Lossless image 90 and a lossy image 95 are then provided to dual-compression module 35 that is configured to compress each of the two images using different compression techniques. More specifically, dual-compression module 35 includes a lossless compression engine 100 and a lossy compression engine 105. Lossless compression engine 100 may be a software application that compresses image 90 in a manner such that substantially all of the data may be recovered upon decompression. In one specific example, lossless compression engine 100 is a GNU zip (Gzip) compression application. Lossy compression engine 105 may be a software application that compresses image 95 by permanently eliminating certain information, particularly redundant data in the image such that only a part of the original data is present and recoverable. In one specific example, lossy compression engine 105 is a Joint Photographic Experts Group 2000 (JPEG2000) compression application.

Lossless compression engine 100 compresses lossless image 90 to form a compressed lossless file ($L_1$) 110. Lossy compression engine 105 compresses lossy image 95 to generate a first compressed lossy file ($P_1$) 115 and a second compressed lossy file ($P_2$) 120. The first and second lossy files 115 and 120, respectively, are compressed versions of the same image 95, but are of different qualities, and thus are of different compressed sizes. More specifically, second compressed lossy file 120 is of significantly higher quality, and thus has a larger compressed size than the first compressed lossy file 115. In one example, first compressed lossy file 115 has a JPEG quality of approximately 35% (i.e., 35% the quality of lossy image 95), while second compressed lossy file 120 has a JPEG quality such that, when combined with first compressed lossy file 115, the total JPEG quality would be approximately 85% (i.e., 85% the quality of lossy image 95).

Compressed lossless file 110, first compressed lossy file 115, and second compressed lossy file 120 are provided to network module 40. Network module 40 comprises a packet generator 125 that combines the compressed lossless file 110 and the first compressed lossy file 115 into one or more packets 130 that are immediately sent to each of the attendee devices 15(1) and 15(2) (via collaboration server 70). This transmission of compressed lossless file 110 and first compressed lossy file 115 allows the attendee devices 15(1) and 15(2) to quickly display the changed image of block 75(1) (i.e., provides real-time updates at the display screens 45(1) and 45(2) of attendee devices 15(1) and 15(2), respectively).

Due, in part, to the bandwidth requirements of the network 65, the second compressed lossy file 120 (which is larger than each of the compressed lossless file 110 and first compressed lossy file 115) is not immediately sent to attendee devices 15(1) and 15(2). Rather, the second compressed lossy file 120 may be temporarily stored in a buffer 135 and only sent to attendee devices 15(1) and 15(2) after a predetermined period of time passes. During this period of time, image capture module 30 (or another element of presenter device 10) monitors block 75(1) for further changes to the displayed image. If no further change in the image is detected during the predetermined period of time, then a notification is sent to network module 40 that the second compressed lossy file 120 should be transmitted to the attendee devices 15(1) and 15(2). Accordingly, packet generator 125 generates one or more packets 140 that include the second compressed lossy file 120 and these packets 140 are transmitted to the collaboration server 70 and ultimately attendee devices 15(1) and 15(2). Upon receipt of these packets 140, the images at display screens 45(1) and 45(2) of attendee devices 15(1) and 15(2), respectively, are updated with the second compressed lossy file 120 so that the image quality is improved (e.g., improved from approximately 35% quality to approximately 85% quality).

If a further change in the image at block 75(1) is detected during the predetermined period of time, the second compressed lossy file 120 is discarded (e.g., deleted from buffer 135), and is not transmitted to the attendee devices 15(1) and 15(2). This deletion of lossy file 120 from the buffer 135 occurs because, if a further change is detected, there is no need to transmit the larger second compressed lossy file 120 as it will be immediately replaced by the data in the next received compressed lossless file 100 and the next first compressed lossy file 115. By discarding the larger second compressed lossy file 120 when a further change is detected, network bandwidth may be conserved.

The above concepts may be better understood with respect to a real-world example in which a user at presenter device 10 scrolls through shared material (e.g., a document, spreadsheet, presentation, etc.) displayed at display screen 20 and shared with users at attendee devices 15(1) and 15(2) during a collaboration session. In such an example, as the user begins to scroll through the material, the image displayed at block 75(1), as well as the other blocks, will change. When the first change is detected, the process described above in FIG. 2 is executed to immediately provide the attendee devices 15(1) and 15(2) with the compressed lossless file 110 and first compressed lossy file 115. This allows the users at attendee devices 15(1) and 15(2) to see that the user at presenter device 10 has started to scroll through the material.

As the user continues to scroll through the displayed material, the image at block 75(1) continues to change. As such, the second compressed lossy file 120 would be discarded and the above process is repeated so as to provide the attendee devices 15(1) and 15(2) with the compressed lossless files 110 and first compressed lossy files 115 so that the display screens 45(1) and 45(2) reflect the scrolling that is occurring at display screen 20. When the user at presenter device 10 stops scrolling, and thus the image stays constant for the predetermined period of time, the last captured second compressed lossy file 120 is transmitted to attendee devices 15(1) and 15(2) for improvement of the displayed image quality.

Figure 3:
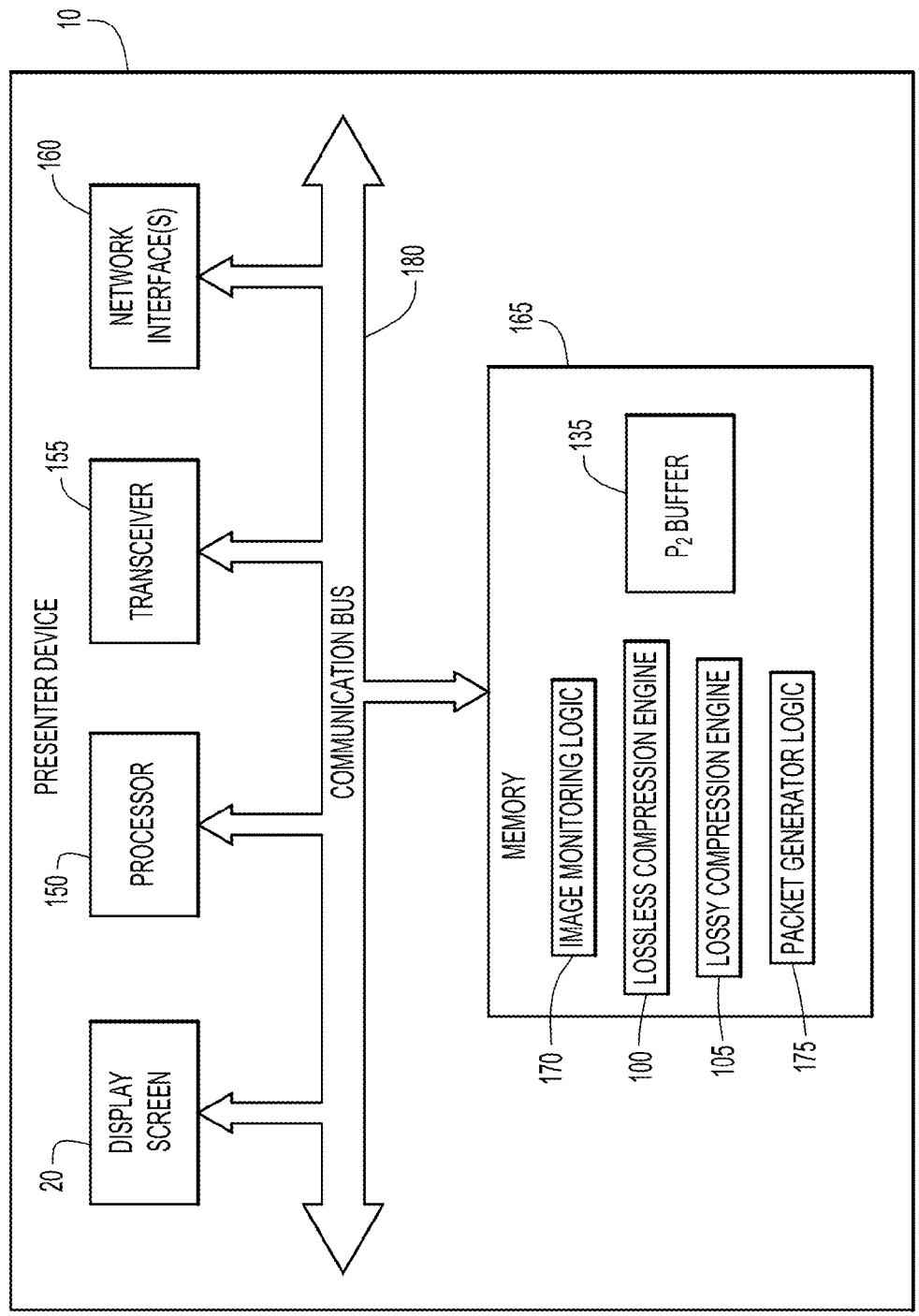
FIG. 3 is a block diagram illustrating one example software configuration of a progressive sharing unit.

FIG. 3 is a block diagram illustrating one example software configuration of progressive sharing unit 25 in presenter device 10. Presenter device 10 comprises, in this example, a display screen 20 (FIG. 2), processor 150, transceiver 155, a network interface 160, and a memory 165. The memory 165 comprises image monitoring logic 170, lossless compression engine 100 (FIG. 2), lossy compression engine 105 (FIG. 2), packet generator logic 175, and a buffer 135 (FIG. 2). As shown, the various components of presenter device 10 are connected by a communication bus 180.

Memory 165 may comprise read only memory (ROM), random access memory (RAM), magnetic disk storage media devices, optical storage media devices, flash memory devices, electrical, optical, or other physical/tangible memory storage devices. The processor 150 is, for example, a microprocessor or microcontroller that executes instructions for the image monitoring logic 170, lossless compression engine 100, lossy compression engine 105, and packet generator logic 175. Thus, in general, the memory 165 may comprise one or more tangible (non-transitory) computer readable storage media (e.g., a memory device) encoded with software comprising computer executable instructions and when the software is executed (by the processor 150) it is operable to perform the operations described herein in connection with image monitoring module 30 (through execution of image monitoring logic 170), lossless compression engine 100, lossy compression engine 105, and packet generator 125 (through execution of packet generator logic 175).

As noted, presenter device 10 comprises a transceiver 155 and a network interface 160. These comprise the hardware components that are used to transmit the packets that contain compressed files 110, 115, and 120 to the attendee devices 15(1) and 15(2).

Figure 4:
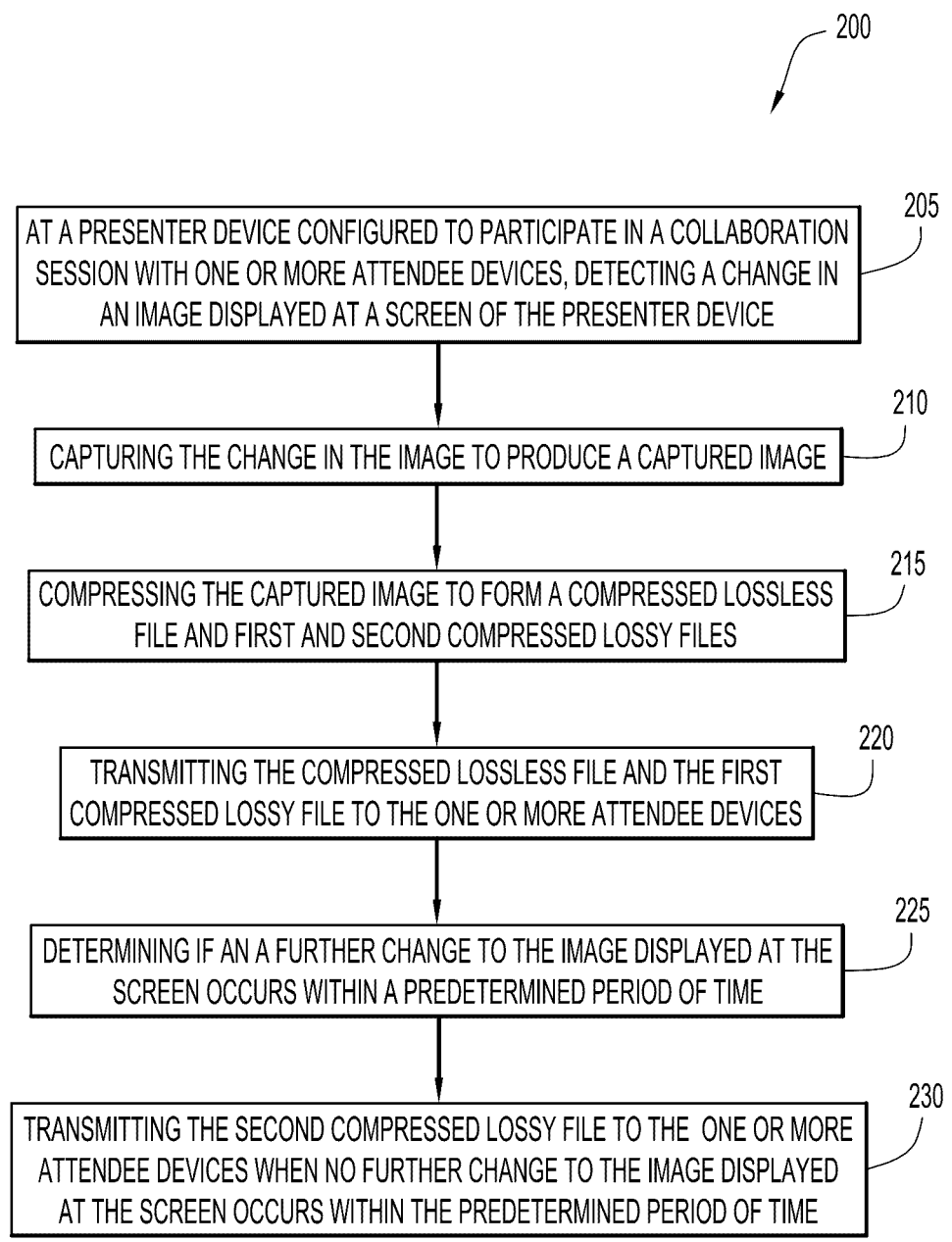
FIG. 4 is a high-level flowchart of a progressive sharing method in accordance with examples described herein.

FIG. 4 is a high-level flowchart of a progressive sharing method 200 in accordance with examples described herein. Method 200 is performed at a presenter device configured to participate in a collaboration session with one or more attendee devices. At 205, a change in an image displayed at a screen of the presenter device is detected. At 210, the changed image is captured to produce a captured image. Next, at 215, the captured image is compressed to form a compressed lossless file and first and second compressed lossy files. At 220, the compressed lossless file and the first compressed lossy file are transmitted to the one or more attendee devices. At 225, a determination is made as to whether a further change to the image displayed at the screen occurs within a predetermined period of time. At 230, if no further change to the image displayed at the screen occurs within the predetermined period of time, the second compressed lossy file is transmitted to the one or more attendee devices.

Figure 5:
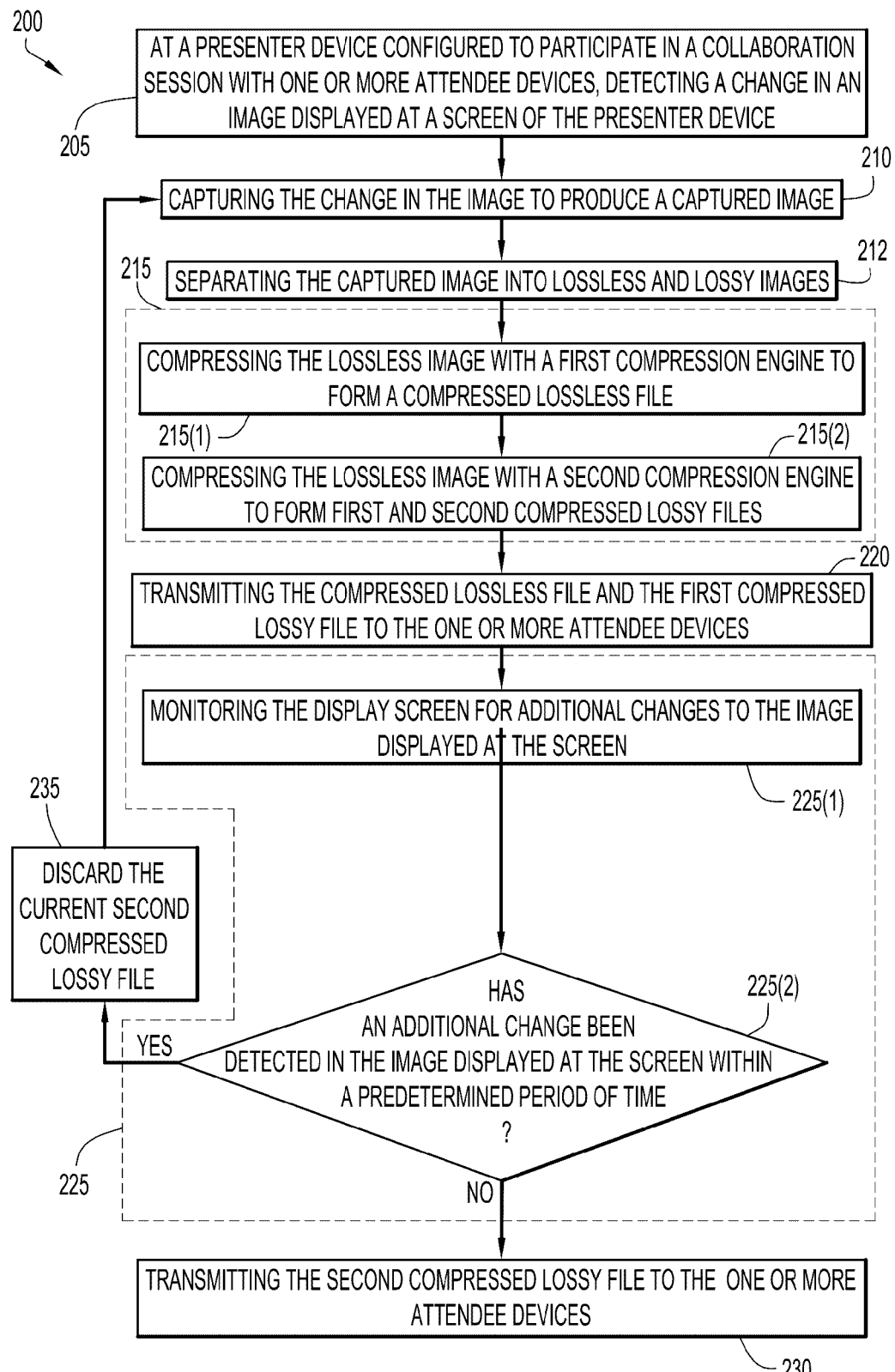
FIG. 5 is a detailed flowchart illustrating further details of the example progressive sharing method of FIG. 4.

FIG. 5 is a detailed flowchart illustrating further details of the example progressive sharing method 200 illustrated in FIG. 4. As noted, method 200 starts at 205 with the detection of a change in the displayed image and the capture of the image at 210. At 212, the captured image is separated into lossless and lossy images.

Next, 215 of FIG. 4 includes two parallel processes at 215(1) and 215(2). More specifically, at 215(1) the lossless image is compressed with a first compression engine (e.g., a lossless compression technique) to form a compressed lossless file. Similarly, at 215(2), the lossy image is compressed with a second compression engine (e.g., a lossy compression technique) to first and second compressed lossy files. At 220, the compressed lossless file and the first compressed lossy file are transmitted to the one or more attendee devices.

In this example, 225 includes two processes 225(1) and 225(2). At 225(1), the screen of the presenter device is monitored for further changes to the displayed image. At 225(2), a determination is made as whether a further change has been detected within a predetermined period of time. If no additional change to the image displayed at the screen occurs within the predetermined period of time, the method proceeds to 230 where the second compressed lossy file is transmitted to the one or more attendee devices (via a collaboration server). However, if a further change is detected, the second compressed lossy file is discarded at 235 and the method returns to 210. The above processes of 210-235 are repeated until no change is detected for the predetermined period of time and the final second compressed lossy file is transmitted to the attendee devices.

The above description is intended by way of example only.

What is claimed is:

1. A method comprising:
   at a presenter device configured to participate in a collaboration session and share content with one or more attendee devices, detecting a change in an image displayed at a screen of the presenter device;
   capturing a changed portion of the image to produce a captured image, wherein the changed portion of the image is a subset of the image displayed at the screen defined by a group of pixels in a logical block of the image, and the change in the image occurred within at least one pixel of the group of pixels, and wherein the captured image comprises a changed portion and an unchanged portion of the logical block, wherein the screen is functionally separated into a plurality of logical blocks, and wherein detecting the change in the image displayed at the screen comprises separately monitoring each of the plurality of logical blocks to individually detect changes in the plurality of logical blocks;
   separating the captured image into a lossless image and a lossy image;
   compressing the lossless image using a first compression technique to form a compressed lossless file and compressing the lossy image using a second compression technique to form a first compressed lossy file and a second compressed lossy file, wherein the first compressed lossy file and the second compressed lossy file are both generated from the lossy image, and wherein the first compressed lossy file and the second compressed lossy file are compressed versions of the lossy image each having a different compression quality such that a size of the second compressed lossy file is larger than a size of the first compressed lossy file;
   transmitting the compressed lossless file and the first compressed lossy file to the one or more attendee devices such that only a representation of the captured image is transmitted;
   determining if a further change to the corresponding changed portion of the image displayed at the screen occurs within a predetermined period of time, wherein if the further change to the corresponding changed portion of the image displayed at the screen occurs within the predetermined period of time, discarding the second compressed lossy file from a buffer of the presenter device to prevent transmission of the second compressed lossy file to the one or more attendee devices; and
   transmitting the second compressed lossy file to the one or more attendee devices when no further change to the corresponding changed portion of the image displayed at the screen occurs within the predetermined period of time, wherein the compressed lossless file, the first compressed lossy file, and the second compressed lossy file are generated and transmitted in a manner to ensure real-time updates of the one or more attendee devices.

2. The method of claim 1, wherein compressing the lossless image with the first compression technique comprises:
   compressing the lossless image with a zip compression application.

3. The method of claim 1, wherein compressing the lossy image with the second compression technique comprises:
   compressing the lossy image with a Joint Photographic Experts Group 2000 compression application.

4. The method of claim 1, wherein after determining the further change to the corresponding changed portion of the image displayed at the screen occurs within the predetermined period of time, further comprising:
   capturing the further change to the corresponding changed portion of the image displayed at the screen to produce a second captured image;
   separating the second captured image into a second lossless image and a second lossy image;

compressing the second lossless image to form an additional compressed lossless file and compressing the second lossy image to form an additional first compressed lossy file and an additional second compressed lossy file, wherein the additional first compressed lossy file and the additional second compressed lossy file are compressed versions of the second lossy image each having a different compression quality such that a size of the additional second compressed lossy file is larger than a size of the additional first compressed lossy file;

transmitting the additional compressed lossless file and the additional first compressed lossy file to the one or more attendee devices;

transmitting the additional second compressed lossy file to the one or more attendee devices after the predetermined period of time has elapsed from transmitting the additional compressed lossless file and the additional first compressed lossy file.

5. The method of claim 1, wherein the lossless image comprises changed portions of the image that need to be exactly recovered upon decompression, and wherein the lossy image comprises changed portions of the image that do not need to be exactly recovered upon decompression.

6. One or more non-transitory computer readable storage media encoded with software comprising computer executable instructions and when the software is executed, operable to:

at a presenter device configured to participate in a collaboration session and share content with one or more attendee devices, detect a change in an image displayed at a screen of the presenter device;

capture a changed portion of the image to produce a captured image, wherein the changed portion of the image is a subset of the image displayed at the screen defined by a group of pixels in a logical block of the image, and the change in the image occurred within at least one pixel of the group of pixels, and wherein the captured image comprises a changed portion and an unchanged portion of the logical block, wherein the screen is functionally separated into a plurality of logical blocks, and wherein detecting the change in the image displayed at the screen comprises separately monitoring each of the plurality of logical blocks to individually detect changes in the plurality of logical blocks;

separate the captured image into a lossless image and a lossy image;

compress the lossless image using a first compression technique to form a compressed lossless file and compress the lossy image using a second compression technique to form a first compressed lossy file and a second compressed lossy file, wherein the first compressed lossy file and the second compressed lossy file are both generated from the lossy image, and wherein the first compressed lossy file and the second compressed lossy file are compressed versions of the lossy image each having a different compression quality such that a size of the second compressed lossy file is larger than a size of the first compressed lossy file;

transmit the compressed lossless file and the first compressed lossy file to the one or more attendee devices such that only a representation of the captured image is transmitted;

determine if a further change to the corresponding changed portion of the image displayed at the screen occurs within a predetermined period of time, wherein if the further change to the corresponding changed portion of the image displayed at the screen occurs within the predetermined period of time, discard the second compressed lossy file from a buffer of the presenter device to prevent transmission of the second compressed lossy file to the one or more attendee devices; and transmit the second compressed lossy file to the one or more attendee devices when no further change to the corresponding changed portion of the image displayed at the screen occurs within the predetermined period of time, wherein the compressed lossless file, the first compressed lossy file, and the second compressed lossy file are generated and transmitted in a manner to ensure real-time updates of the one or more attendee devices.

7. The non-transitory computer readable storage media of claim 6, wherein the instructions operable to compress the lossless image with the first compression technique comprise instructions operable to:

compress the lossless image with a zip compression application.

8. The non-transitory computer readable storage media of claim 6, wherein the instructions operable to compress the lossy image with the second compression technique comprise instructions operable to:

compress the lossy image with a Joint Photographic Experts Group 2000 compression application.

9. The non-transitory computer readable storage media of claim 6, wherein after determining the further change to the corresponding changed portion of the image displayed at the screen occurs within the predetermined period of time, the instructions are further operable to:

capture the further change to the corresponding changed portion of the image displayed at the screen to produce a second captured image;

separate the second captured image into a second lossless image and a second lossy image;

compress the second lossless image to form an additional compressed lossless file and compress the second lossy image to form an additional first compressed lossy file and an additional second compressed lossy file, wherein the additional first compressed lossy file and the additional second compressed lossy file are compressed versions of the second lossy image each having a different compression quality such that a size of the additional second compressed lossy file is larger than a size of the additional first compressed lossy file;

transmit the additional compressed lossless file and the additional first compressed lossy file to the one or more attendee devices;

transmit the additional second compressed lossy file to the one or more attendee devices after the predetermined period of time has elapsed from the transmission of the additional compressed lossless file and the additional first compressed lossy file.

10. An apparatus comprising:

a display screen configured to display material shared with one or more attendee devices in a collaboration session;

one or more network interfaces; and a processor configured to:

detect a change in an image displayed at the screen, capture a changed portion of the image to produce a captured image, wherein the changed portion of the image is a subset of the image displayed at the screen defined by a group of pixels of a logical block of the image, and the change in the image occurred within at least one pixel of the group of pixels, and wherein the captured image comprises a changed portion and an unchanged portion of the logical block, wherein the screen is functionally separated into a plurality of logical blocks, and wherein detecting the change in the image displayed at the screen comprises separately monitoring each of the plurality of logical blocks to individually detect changes in the plurality of logical blocks, separate the captured image into a lossless image and a lossy image, compress the lossless image using a first compression technique to form a compressed lossless file and compress the lossy image using a second compression technique to form a first compressed lossy file and a second compressed lossy file, wherein the first compressed lossy file and the second compressed lossy file are both generated from the lossy image, and wherein the first compressed lossy file and the second compressed lossy file are compressed versions of the lossy image each having a different compression quality such that a size of the second compressed lossy file is larger than a size of the first compressed lossy file, transmit the compressed lossless file and the first compressed lossy file to the one or more attendee devices via the one or more network interfaces such that only a representation of the captured image is transmitted, determine if a further change to the corresponding changed portion of the image displayed at the screen occurs within a predetermined period of time, wherein if the further change to the corresponding changed portion of the image displayed at the screen occurs within the predetermined period of time, discard the second compressed lossy file from a buffer to prevent transmission of the second compressed lossy file to the one or more attendee devices, and transmit the second compressed lossy file to the one or more attendee devices via the one or more network interfaces when no further change to the corresponding changed portion of the image displayed at the screen occurs within the predetermined period of time, wherein the compressed lossless file, the first compressed lossy file, and the second compressed lossy file are generated and transmitted in a manner to ensure real-time updates of the one or more attendee devices.

11. The apparatus of claim 10, wherein to compress the lossless image with the first compression technique, the processor is configured to execute a zip compression application.

12. The apparatus of claim 10, wherein to compress the lossless image with the first compression technique, the processor is configured to execute a Joint Photographic Experts Group 2000 compression application.

13. The apparatus of claim 10, wherein after determining the further change to the corresponding changed portion of the image displayed at the screen occurs within the predetermined period of time, the processor is further configured to:

capture the further change to the corresponding changed portion of the image displayed at the screen to produce a second captured image, separate the second captured image into a second lossless image and a second lossy image, compress the second lossless image to form an additional compressed lossless file and compress the second lossy image to form an additional first compressed lossy file and an additional second compressed lossy file, wherein the additional first compressed lossy file and the additional second compressed lossy file are compressed versions of the second lossy image each having a different compression quality such that a size of the additional second compressed lossy file is larger than a size of the additional first compressed lossy file, transmit the additional compressed lossless file and the additional first compressed lossy file to the one or more attendee devices, and transmit the additional second compressed lossy file to the one or more attendee devices after the predetermined period of time has elapsed from the transmission of the additional compressed lossless file and the additional first compressed lossy file.

* * * * *